(12) United States Patent
Shivarudraiah et al.

(10) Patent No.: US 9,785,687 B2
(45) Date of Patent: Oct. 10, 2017

(54) SYSTEM AND METHOD FOR TRANSPARENT MULTI KEY-VALUE WEIGHTED ATTRIBUTED CONNECTION USING UNI-TAG CONNECTION POOLS

(71) Applicant: ORACLE INTERNATIONAL CORPORATION, Redwood Shores, CA (US)

(72) Inventors: Ashok Shivarudraiah, Fremont, CA (US); Jean De Lavarene, Menlo Park, CA (US); Tong Zhou, Merrick, NY (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 451 days.

(21) Appl. No.: 14/202,348

(22) Filed: Mar. 10, 2014

(65) Prior Publication Data

US 2014/0379756 A1 Dec. 25, 2014

Related U.S. Application Data

(60) Provisional application No. 61/838,805, filed on Jun. 24, 2013.

(51) Int. Cl.
*G06F 17/30* (2006.01)
(52) U.S. Cl.
CPC .............................. *G06F 17/3056* (2013.01)
(58) Field of Classification Search
None
See application file for complete search history.

(56) References Cited

U.S. PATENT DOCUMENTS 4,698,749 A 10/1987 Bhadriraju
6,338,089 B1 * 1/2002 Quinlan ............ G06F 17/30899
707/E17.119

(Continued)

FOREIGN PATENT DOCUMENTS

WO 2006073865 7/2006
WO 2012037163 3/2012

OTHER PUBLICATIONS

Gardner, Black's Law Dictionary 2004, West, 8th ed., 1627.*

(Continued)

*Primary Examiner* — Jason Liao
(74) *Attorney, Agent, or Firm* — Tucker Ellis LLP

(57) ABSTRACT

A system and method for transparent multi key-value weighted attributed connection using uni-tag connection pools. In accordance with an embodiment, a connection pool enables labeling of connections that software applications can use to access a database. A connection pool associated with a database enables tagging of connection pools at the database and allows applications to selectively obtain connections based on tags. A request is received from an application to query data from the database using a labeled connection or low-cost alternative. If a low-cost connection is found, but requires configuration, the system returns unmatched labels for use by the application in configuring its environment to use the connection. The system can also generate a tag for the connection. Upon subsequent release of the database session, the tag can be made available for subsequent use of the tag, or a tagged connection, by the same or by other applications.

20 Claims, 7 Drawing Sheets

(56) References Cited

U.S. PATENT DOCUMENTS

| | | |
|---|---|---|
| 8,285,758 B1 | 10/2012 | Bono |
| 2003/0130909 A1 | 7/2003 | Caci |
| 2004/0088413 A1 | 5/2004 | Bhogi |
| 2005/0015411 A1 | 1/2005 | Altman |
| 2005/0028164 A1 | 2/2005 | Neuwald |
| 2005/0038801 A1* | 2/2005 | Colrain ............ G06F 17/30289 |
| 2006/0143187 A1 | 6/2006 | Mukkamalla |
| 2006/0146878 A1 | 7/2006 | Srivastava |
| 2009/0064199 A1 | 3/2009 | Bidelis et al. |
| 2009/0094589 A1 | 4/2009 | Gupta |
| 2009/0282369 A1 | 11/2009 | Jones |
| 2011/0154329 A1 | 6/2011 | Arcese |
| 2011/0218981 A1 | 9/2011 | Retnakumari |
| 2012/0066363 A1 | 3/2012 | Somogyi |
| 2012/0136602 A1 | 5/2012 | Hossain |
| 2013/0018919 A1 | 1/2013 | Peek |
| 2013/0144984 A1 | 6/2013 | Zhao |
| 2016/0012155 A1 | 1/2016 | Shivarudraiah |
| 2016/0077761 A1 | 3/2016 | Stabrawa |
| 2016/0092365 A1 | 3/2016 | Shivarudraiah |

OTHER PUBLICATIONS

Anonymous, Database Connection Pool Management, Research Disclosure, Dec. 1, 1998, 3 pages, vol. 41, No. 416, Mason Publications, Hampshire, GB.

International Searching Authority at the European Patent Office, International Search Report and Written Opinion for PCT International Patent Application No. PCT/US2014/035187, Aug. 5, 2014, 11 pages.

* cited by examiner

SYSTEM AND METHOD FOR TRANSPARENT MULTI KEY-VALUE WEIGHTED ATTRIBUTED CONNECTION USING UNI-TAG CONNECTION POOLS

CLAIM OF PRIORITY

This application claims the benefit of priority to U.S. Provisional Patent Application titled "SYSTEM AND METHOD FOR TRANSPARENT MULTI KEY-VALUE WEIGHTED ATTRIBUTED CONNECTION USING UNI-TAG CONNECTION POOLS", Application No. 61/838,805; filed Jun. 24, 2013, which application is incorporated herein by reference.

CROSS-REFERENCE TO RELATED APPLICATIONS

This application is related to the following U.S. Patent Applications, each of which applications is incorporated herein by reference: U.S. Patent Application titled "SYSTEM AND METHOD FOR CONNECTION LABELING FOR USE WITH CONNECTION POOLS", application Ser. No. 13/912,086, filed Jun. 6, 2013; U.S. Patent Application titled "SUPPORT FOR CLOUD-BASED MULTI-TENANT ENVIRONMENTS USING CONNECTION LABELING", application Ser. No. 13/912,098, filed Jun. 6, 2013; U.S. Patent Application titled "SYSTEM AND METHOD FOR PROVIDING A SECOND LEVEL CONNECTION CACHE FOR USE WITH A DATABASE ENVIRONMENT", application Ser. No. 14/253,580 filed, Apr. 15, 2014; U.S. Patent Application titled "SYSTEM AND METHOD FOR PROVIDING A SHARABLE GLOBAL CACHE FOR USE WITH A DATABASE ENVIRONMENT", application Ser. No. 14/253,573 filed, Apr. 15, 2014; U.S. Patent Application titled "EFFICIENT STORAGE AND RETRIEVAL OF FRAGMENTS FRAGMENTED DATA USING PSEUDO LINEAR DYNAMIC BYTE ARRAY", application Ser. No. 14/259,499 filed, Apr. 23, 2014; U.S. Patent Application titled "SYSTEM AND METHOD FOR MARSHALING MASSIVE DATABASE DATA FROM NATIVE LAYER TO JAVA USING LINEAR ARRAY", application Ser. No. 14/251,410 filed Apr. 11, 2014.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and databases, and are particularly related to a system and method for transparent multi key-value weighted attributed connection using uni-tag connection pools.

BACKGROUND

Generally described, a connection pool is a cache of database connection objects. The connection objects represent physical database connections that can be used by a software application to connect to a database. At runtime, an application can request a connection from the pool. If the pool contains a connection that can satisfy the request, it returns the connection to the application. If no connections are found, a new connection can be created and returned to the application. The application uses the connection to access the database to perform work, and then returns the connection to the pool. The connection can then be made available for subsequent connection requests.

Creating connections can be costly both in terms of time and resources. For example, tasks such as network communication, authentication, transaction enlistment, and memory allocation all contribute to the amount of time and resources it takes to create a connection object. Connection pools allow reuse of such connection objects, and reduce the number of times that objects must be created.

One example of a connection pool is Oracle Universal Connection Pool (UCP), which provides a connection pool for caching Java Database Connectivity, (JDBC) connections. Java applications that are database-intensive can use the connection pool to improve performance utilization of system resources. A UCP connection pool can use any JDBC driver to create physical connections that are then maintained by the pool. The connection pool can be configured with properties that are used to optimize pool behavior, based on the performance and availability requirements of an application.

SUMMARY

Described herein is a system and method for transparent multi key-value weighted attributed connection using uni-tag connection pools. In accordance with an embodiment, a connection pool enables labeling of connections that software applications can use to access a database. A connection pool associated with a database enables tagging of connection pools at the database and allows applications to selectively obtain connections based on tags. A request is received from an application to query data from the database using a labeled connection or low-cost alternative. If a low-cost connection is found, but requires configuration, the system returns unmatched labels for use by the application in configuring its environment to use the connection. The system can also generate a tag for the connection. Upon subsequent release of the database session, the tag can be made available for subsequent use of the tag, or a tagged connection, by the same or by other applications.

DETAILED DESCRIPTION

As described above, a connection pool is a cache of database connection objects. The connection objects represent physical database connections that can be used by a software application to connect to a database. At runtime, an application can request a connection from the pool. If the pool contains a connection that can satisfy the request, it returns the connection to the application. If no connections are found, a new connection can be created and returned to the application. The application uses the connection to access the database to perform work, and then returns the connection to the pool. The connection can then be made available for subsequent connection requests.

In accordance with an embodiment, described herein is a system and method for transparent multi key-value weighted attributed connection using uni-tag connection pools. In accordance with an embodiment, a connection pool enables labeling of connections that software applications can use to access a database. A connection pool associated with a database enables tagging of connection pools at the database and allows applications to selectively obtain connections based on tags. A request is received from an application to query data from the database using a labeled connection or low-cost alternative. If a low-cost connection is found, but requires configuration, the system returns unmatched labels for use by the application in configuring its environment to use the connection. The system can also generate a tag for the connection. In accordance with an embodiment, upon subsequent release of the database session and the connection being closed, the tag can be made available for subsequent use of the tag, or a tagged connection, by the same or by other applications.

In accordance with an embodiment, the system can utilize a connection labeling feature, such as that provided by Universal Connection Pool (UCP). A connection labeling feature allows user applications or clients to selectively obtain a connection based on labels and values. In accordance with an embodiment, the labels can be indicated as name value pairs. A user-implemented cost method can be used to determine a connection with least cost for their particular application. A user-implemented configure method can be used to configure connections according to the requirements of their application environment.

In accordance with an embodiment, the system can utilize a connection pool tagging feature, such as that provided by Oracle Database Resident Connection Pool (DRCP). A connection pool tagging feature allows user applications or clients to selectively obtain a connection based on a single tag. In accordance with an embodiment, only one tag is associated per connection. The database server does not communicate the tag value to the user applications or clients, but instead communicates a tag-match (BOOLEAN).

Figure 1:
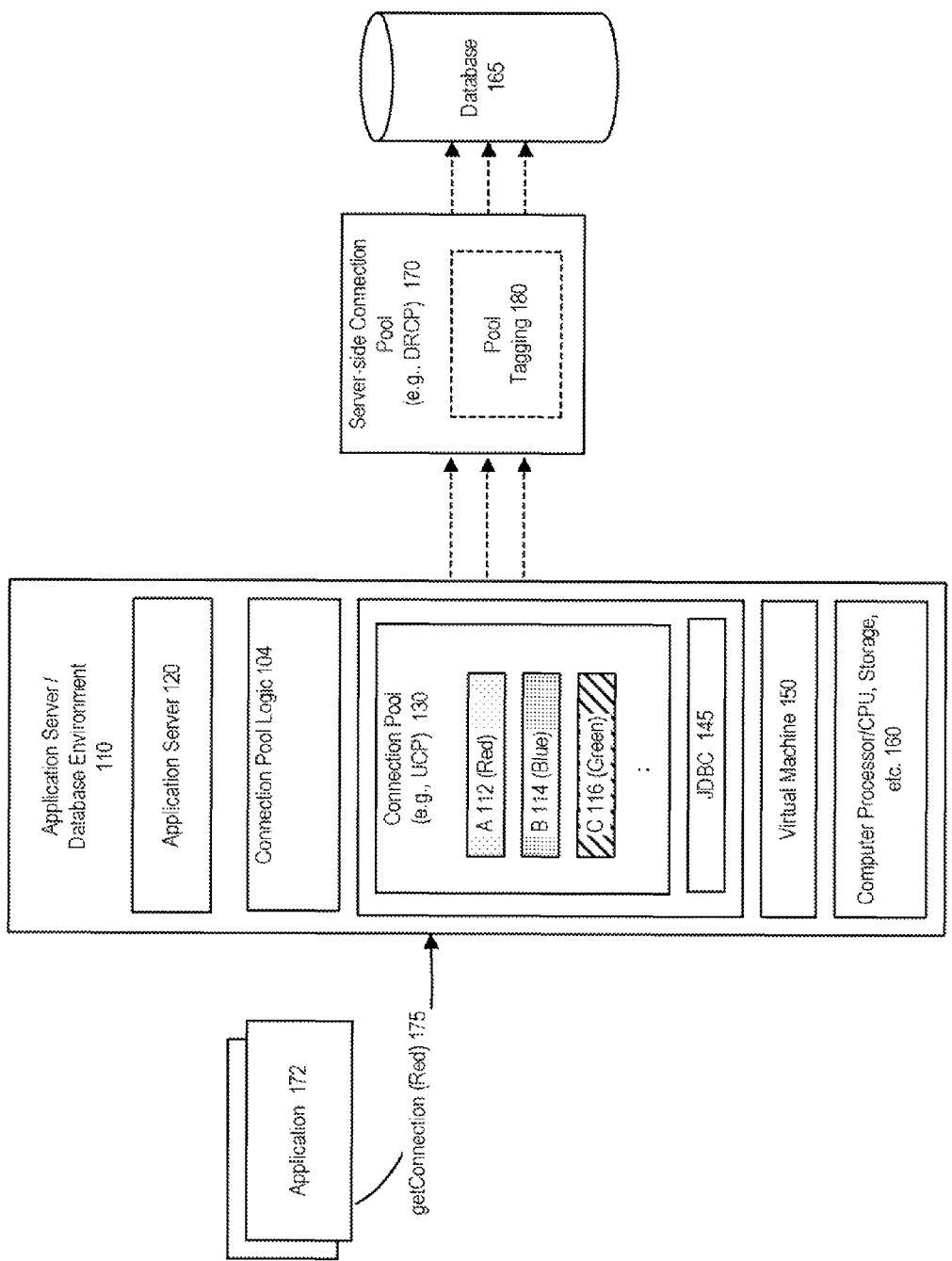
FIG. 1 illustrates a system for transparent multi key-value weighted attributed connection using uni-tag connection pools, in accordance with an embodiment.

FIG. 1 illustrates a system for transparent multi key-value weighted attributed connection using uni-tag connection pools, in accordance with an embodiment.

As shown in FIG. 1, an application server/database environment 110, such as an Oracle Fusion Applications environment, can include or provide access to a database 165.

As further shown in FIG. 1, the system also includes a physical computer processor/CPU and storage 160; a virtual machine (e.g., a Java virtual machine) 150; and an application server 120 that enables access by software applications, using a connection pool (e.g., Oracle UCP) 130 and a database driver (e.g., a JAVA Database Connectivity (JDBC) driver) 145, to access or update data in the database. In accordance with an embodiment, the system can further include a connection pool logic 104, which controls the creation and use of objects in the connection pool.

In accordance with an embodiment, the various connections in the connection pool can be labeled by an application 172, which can attach arbitrary name/value pairs, such as date format and language settings, to a connection.

In accordance with an embodiment, a connection may have multiple labels, each of which is associated with a key-value pair and uniquely identifies the connection based on some desired criteria pertinent to that application.

In accordance with an embodiment, the application can request a connection with a desired label from the connection pool. By associating particular labels with particular connection states, an application can retrieve an already initialized connection from the pool and avoid the time and cost of re-initialization. Connection labeling does not impose any meaning on user-defined keys or values; the meaning of any user-defined keys and values is defined solely by the application.

As an illustrative example, as shown in FIG. 1, the connection pool can include a plurality of connections, which are indicated in the figure as connections A 112, B 114 and C 116 in accordance with an embodiment, each of the connections can be labeled. For example, as shown in FIG. 1, connection A 112 is labeled (Red), connection B 114 is labeled (Blue) and connection C 116 is labeled (Green). These labels/colors are provided for purposes of illustration. In accordance with various embodiments, different types of labels can be used to distinguish between different connection types.

In accordance with an embodiment, if the application wishes to make a request on the database, using a particular type of connection, for example a (Red) connection, it can make a getConnection (Red) request 175. In response, the connection pool logic can return the connection A 112 (Red) if the connection is not in use, or repurpose another connection.

As further shown in FIG. 1, in accordance with an embodiment, the system can also include a server-side connection pool 170, such as a DRCP connection pool. The service-side connection pool enables tagging 180 of the connection pool at the database, and allows applications to selectively obtain connections based on tags.

In accordance with an embodiment, only one tag is associated per connection; and each tag can be a single string.

Figure 2:
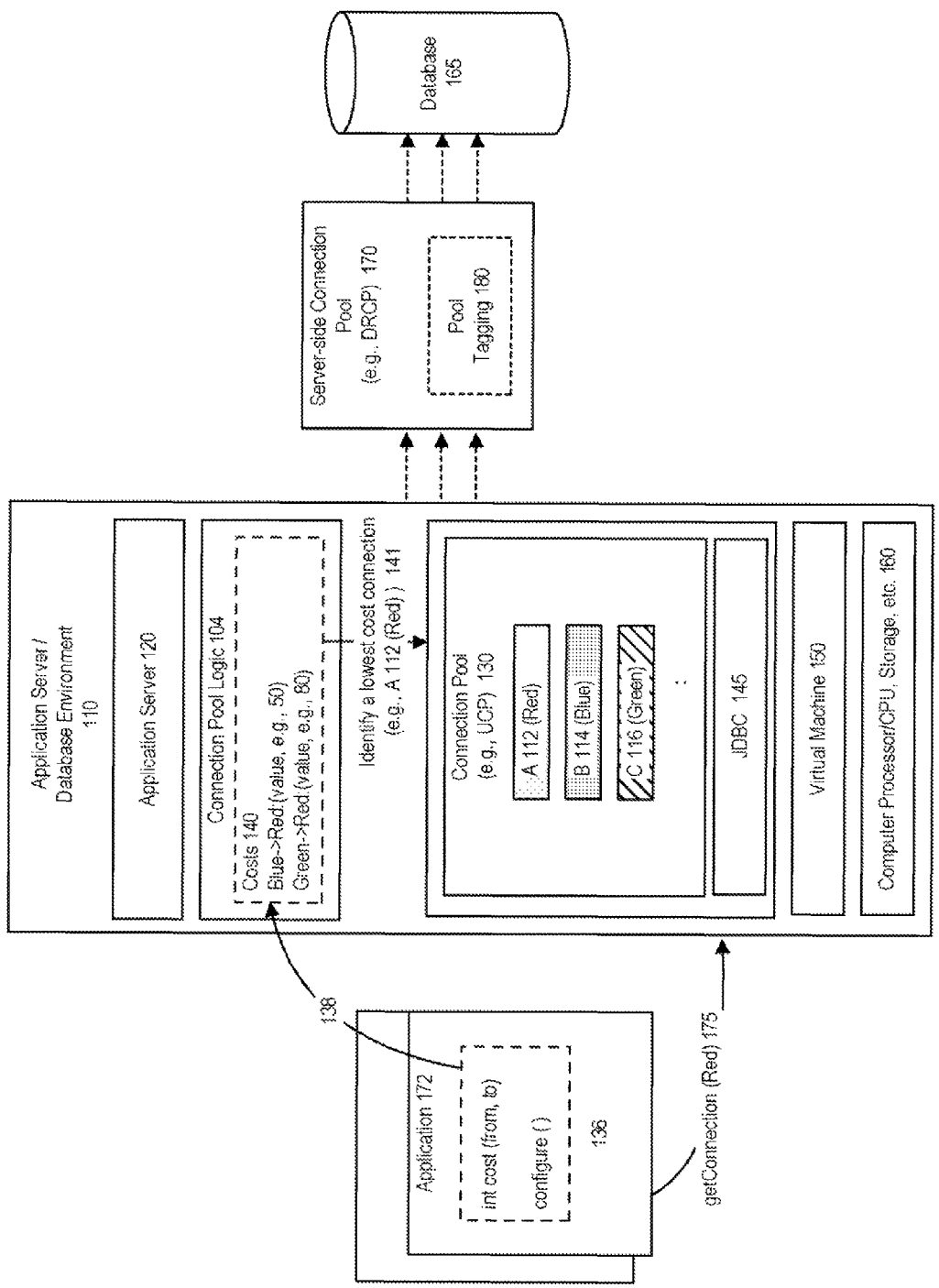
FIG. 2 further illustrates a system for transparent multi key-value weighted attributed connection using uni-tag connection pools, in accordance with an embodiment.

FIG. 2 further illustrates a system for transparent multi key-value weighted attributed connection using uni-tag connection pools, in accordance with an embodiment.

In accordance with an embodiment, each particular software application can utilize a cost function callback to provide configuration information 136 that defines, for that particular application, costs associated with repurposing connections to a desired state.

As an illustrative example, a particular application may consider the cost of repurposing a (Blue) connection to a (Red) connection to have a value (or incur a cost) of 50; and the cost of repurposing a (Green) connection to a (Red) connection to have a value of 80. The meanings of these values are similarly defined by the application, and the above are provided for purposes of illustration. In accordance with various embodiments, different numeric or non-numeric values can be used to distinguish between different connection costs.

In accordance with an embodiment, when a request from an application, for a connection with a particular label (e.g., a Red connection), is received, the connection pool logic iterates over each connection available in the pool. For each connection it is aware of, the connection pool can call a cost method. The result of the cost method can be an integer which represents an estimate of the cost required to reconfigure that connection to the required state represented by the particular label or labels. Generally, the larger the value, the costlier it is to reconfigure the connection.

In accordance with an embodiment, the configuration information 140 provided 138 by the application can be used by the connection pool logic in determining 141 which connection to select or repurpose, to respond to a particular request.

In accordance with an embodiment, the connection pool logic first determines if there is a perfect or existing match (i.e., in this example, an idle Red connection). If no such connection is found, the connection pool logic finds the cheapest connection that can be repurposed (to be a Red connection). In accordance with an embodiment, a perfectly matched connection, or a cheapest connection, can be considered the lowest cost connection.

Attaching Connections to a Server Process

Figure 3:
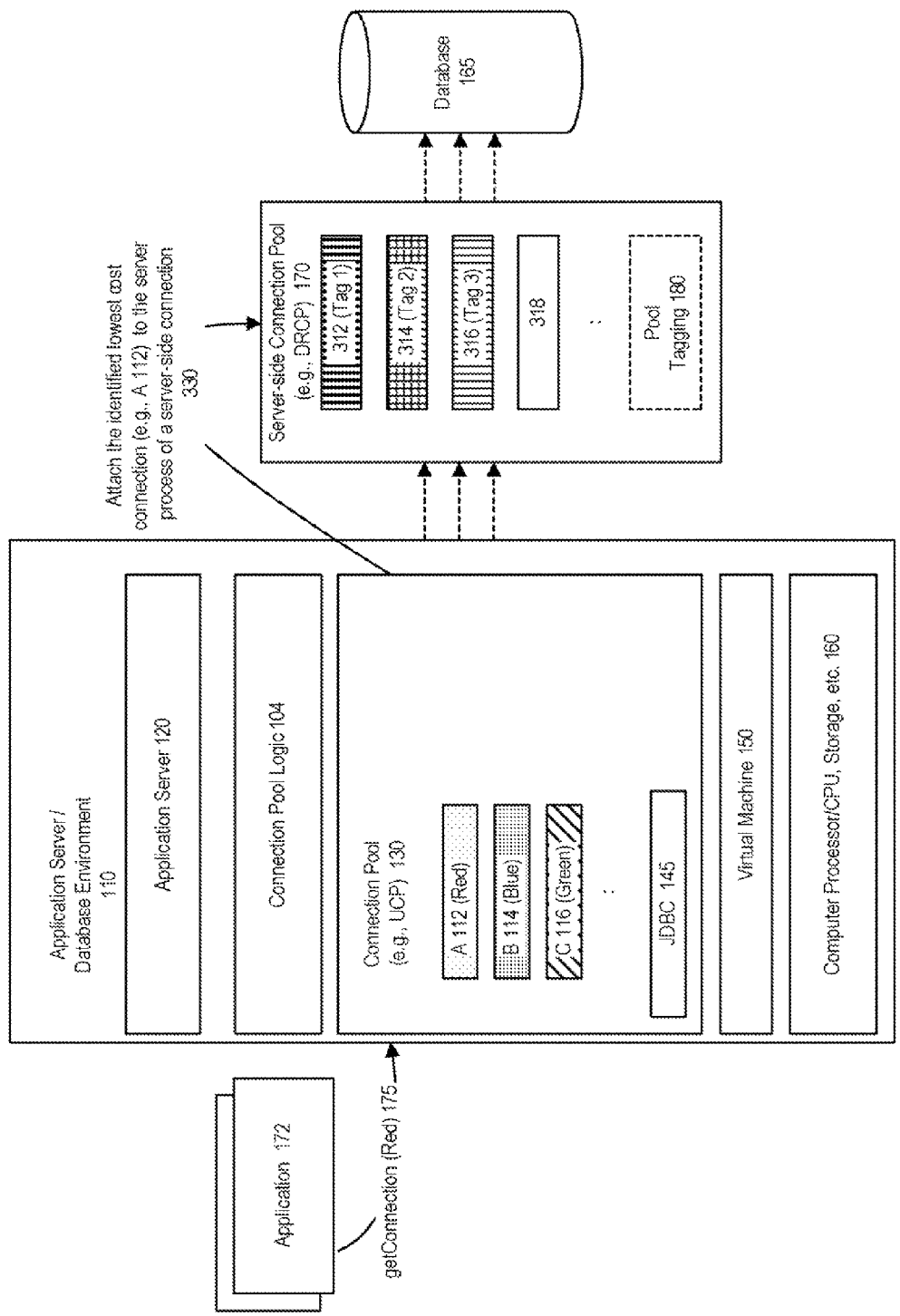
FIG. 3 further illustrates a system for transparent multi key-value weighted attributed connection using uni-tag connection pools, in accordance with an embodiment.

FIG. 3 further illustrates a system for transparent multi key-value weighted attributed connection using uni-tag connection pools, in accordance with an embodiment.

As shown in FIG. 3, connection pool tagging feature such as that provided by Oracle Database Resident Connection Pool (DRCP) can be used to pool dedicated servers or connections A1 312, B1 314 and C1 316, each of which is the equivalent of a server foreground process and a database session combined and henceforth is referred to as a pooled server. In accordance with an embodiment, a connection broker process can be used to manage the pooled servers at the database instance. Clients are persistently connected and authenticated to the broker process, and can request the broker to provide pooled servers when they need to perform some database activity. The clients can use the connections, and then release them back for reuse by other clients.

In accordance with an embodiment, each of these connections or pooled servers can be associated with a particular tag name or other value. As an illustrative example, as shown in FIG. 3, connection 312 is tagged with "Tag 1", connection 314 is tagged with "Tag 2" and connection 316 is tagged with "Tag 3". In accordance with an embodiment, each tag can be a single string that can include multiple configuration properties of a connection. Each connection can have only one tag.

The examples of tags described above and illustrated in the figures are provided for purposes of illustration. In accordance with various embodiments, different types of tags, names, or values, can be used to distinguish between different connection types.

In accordance with an embodiment, the lowest cost connection, once identified, can be attached 330 by the UCP connection pool to the server process of a server-side DRCP connection. In accordance with an embodiment, the process of attaching includes associating a UCP connection with a server process in the DRCP connection pool.

In accordance with an embodiment, during the process of attaching, the UCP connection pool can use the labels on the lowest connection to determine which of the tagged server-side connections to use for the user applications or clients.

Figure 4:
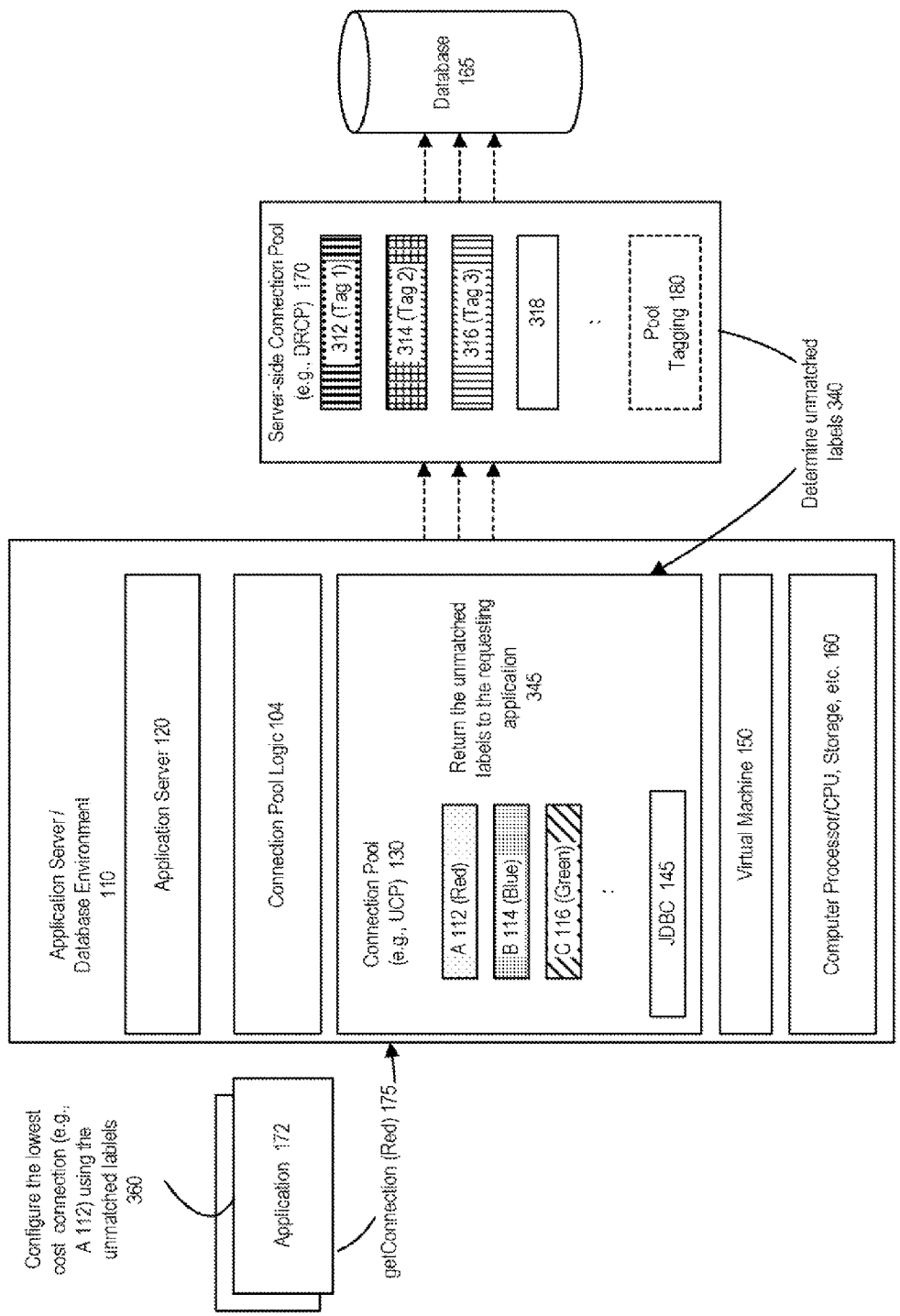
FIG. 4 further illustrates a system for transparent multi key-value weighted attributed connection using uni-tag connection pools, in accordance with an embodiment.

FIG. 4 further illustrates a system for transparent multi key-value weighted attributed connection using uni-tag connection pools, in accordance with an embodiment.

In accordance with an embodiment, if there is no appropriate tagged server-side connection to use for the user application, the UCP connection pool can determine the unmatched labels 340, and return the unmatched labels to the user application or client 345, for use by any user-implemented configure method in configuring the application environment to use the connection 360.

Figure 5:
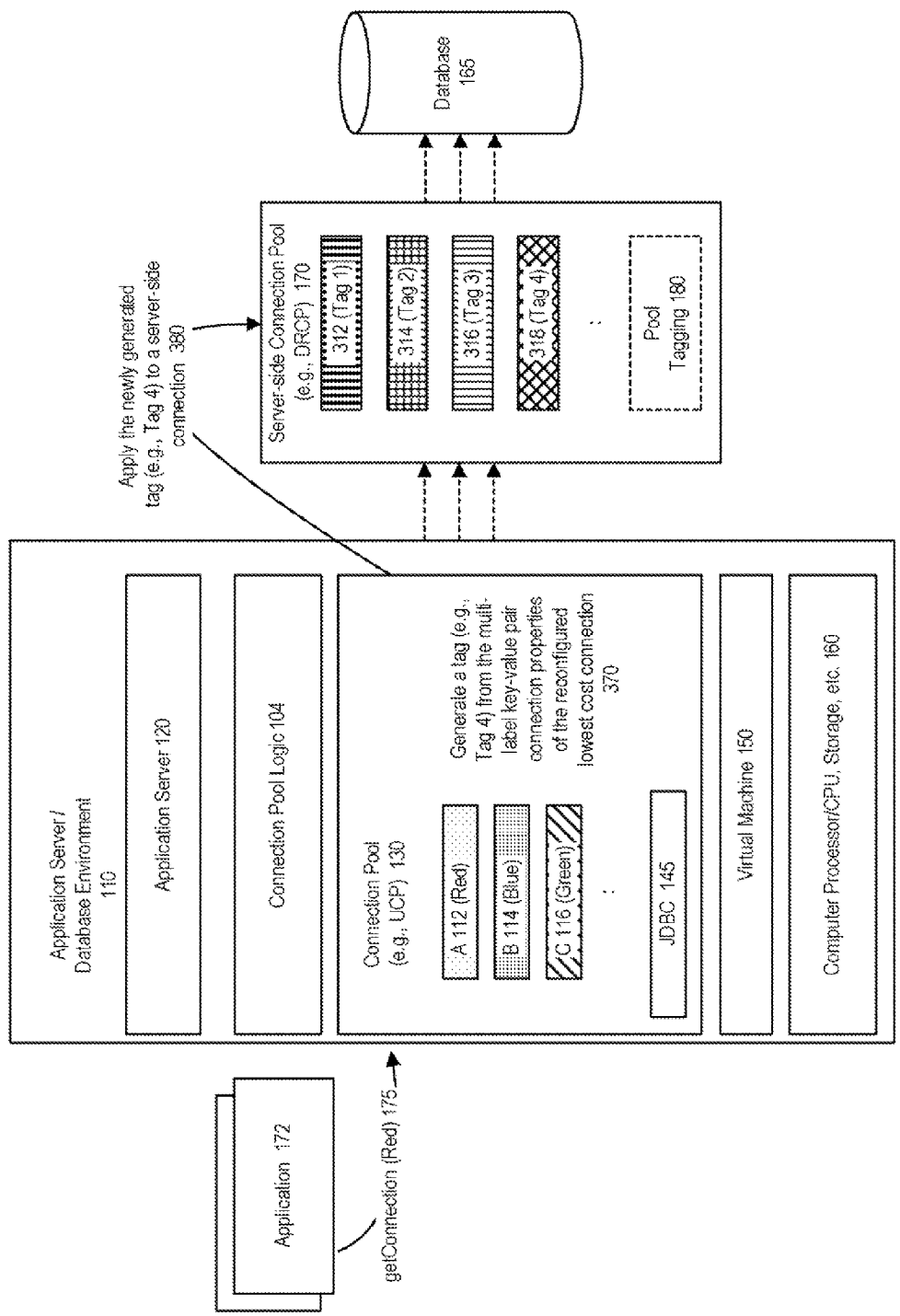
FIG. 5 further illustrates a system for transparent multi key-value weighted attributed connection using uni-tag connection pools, in accordance with an embodiment.

FIG. 5 further illustrates a system for transparent multi key-value weighted attributed connection using uni-tag connection pools, in accordance with an embodiment.

In accordance with an embodiment, upon subsequent release of the database session and the connection being closed, the system can generate a uni-tag out of the multi-label connection properties associated with the connection 370, and apply the tag 380 to a server-side connection, e.g., 318 (Tag 4), for subsequent use by other applications on the same middle-tier processes on the same middle-tier host and even across middle-tier hosts. In accordance with an embodiment, both the tag and the tagged connection can be made available for subsequent use by the same or by other applications.

Transparent Multi Key-Value Weighted Attributed Connections

Listings 1-4 provide an example pseudocode that illustrates how the system can provide transparent multi key-value weighted attributed connection using uni-tag connection pools, in accordance with an embodiment.

As illustrated in the example shown in Listing 1, in accordance with an embodiment, the system attempts to obtain a server pooled connection with a provided label, or alternatively a connection having a lowest cost.

Listing 1

```
GETCONNECTION(REQUESTED_LABELS):
    LOOP THROUGH AVAILABLE_CONNECTIONS
        INVOKE COST_CALLBACK
        DETERMINE LOWEST COST
    END LOOP;
    IF FOUND CONNECTION_WITH_LOWEST_COST AND
NEED_TO_CONFIGURE THEN
        INVOKE CONFIGURE( );
    END IF;
    RETURN CONNECTION_WITH_LOWEST_COST;
END GETCONNECTION;
```

As illustrated in the example shown in Listing 2, in accordance with an embodiment, the system determines if there is a need to configure the connection.

Listing 2

```
NEED_TO_CONFIGURE:
    ATTACH_TO_DATABASE;
    RETURN NOT TAG_MATCHED;
END NEED_TO_CONFIGURE;
```

As illustrated in the example shown in Listing 3, in accordance with an embodiment, the system determines any unmatched labels, which can be returned to the user application or client, for use by any user-implemented configure method in configuring the application environment to use the connection.

---
Listing 3
---
```
GET_UNMATCHED_LABELS(POOLED_CONNECTION,
REQUESTED_LABELS):
    IF POOLED_CONNECTION.TAG_MATCHED THEN
        RETURN NULL;
    ELSE
        RETURN REQUESTED_LABELS;
END GET_UNMATCHED_LABELS;
```
---

As illustrated in the example shown in Listing 4, in accordance with an embodiment, upon closing the connection, the system can reduce the multi-label key-value pair to a tag, including generating a tag.

---
Listing 4
---
```
CLOSE_CONNECTION(CONNECTION_LABELS):
    TAG = CREATE_TAG(CONNECTION_LABELS); //
    USES KEY VALUE PAIR TO GENERATE TAG
        RELEASE_DATABASE_SESSION(TAG);
END CLOSE_CONNECTION;
```
---

The above examples of pseudocode are provided by way of illustration and in accordance with an embodiment. In accordance with other embodiments, different and/or other steps can be used.

Figure 6:
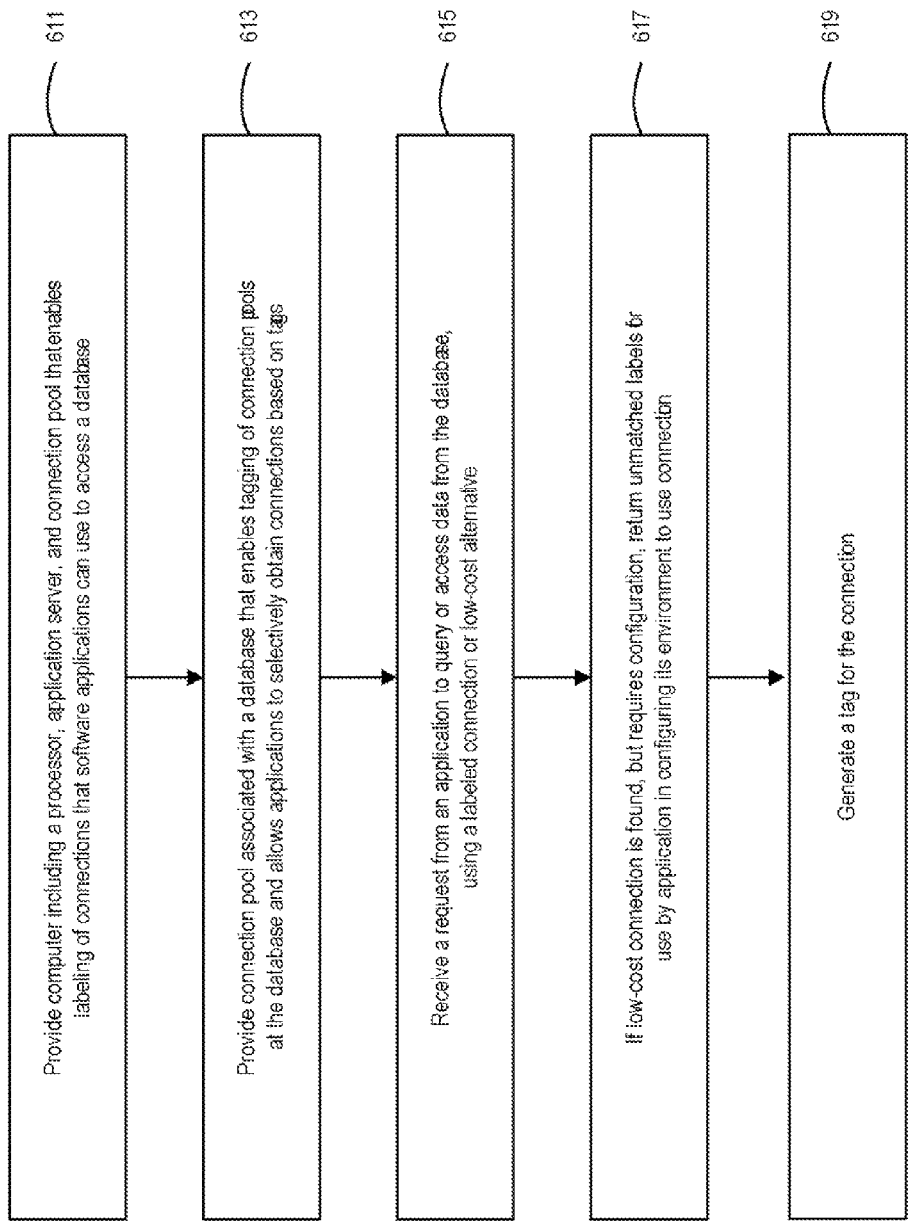
FIG. 6 is a flowchart that illustrates a method of transparent multi key-value weighted attributed connection using uni-tag connection pools, in accordance with an embodiment.

FIG. 6 is a flowchart that illustrates a method of transparent multi key-value weighted attributed connection using uni-tag connection pools, in accordance with an embodiment.

As shown in FIG. 6, at a first step 611, a computer environment is provided, including a processor, application server, and a connection pool that enables labeling of connections that software applications can use to access a database.

At step 613, a connection pool associated with a database is provided that enables tagging of connection pools at the database and allows applications to selectively obtain connections based on tags.

At step 615, a request is received from an application to query (e.g., select) data from the database using a labeled connection or low-cost alternative.

At step 617, if a low-cost connection is found, but requires configuration, the system returns unmatched labels for use by the application in configuring its environment to use the connection. The system can also generate a tag for the connection, at step 619.

In accordance with an embodiment, upon subsequent release of the database session and the connection being closed, the tag can be made available for subsequent use of the tag, or a tagged connection, by the same or by other applications.

Figure 7:
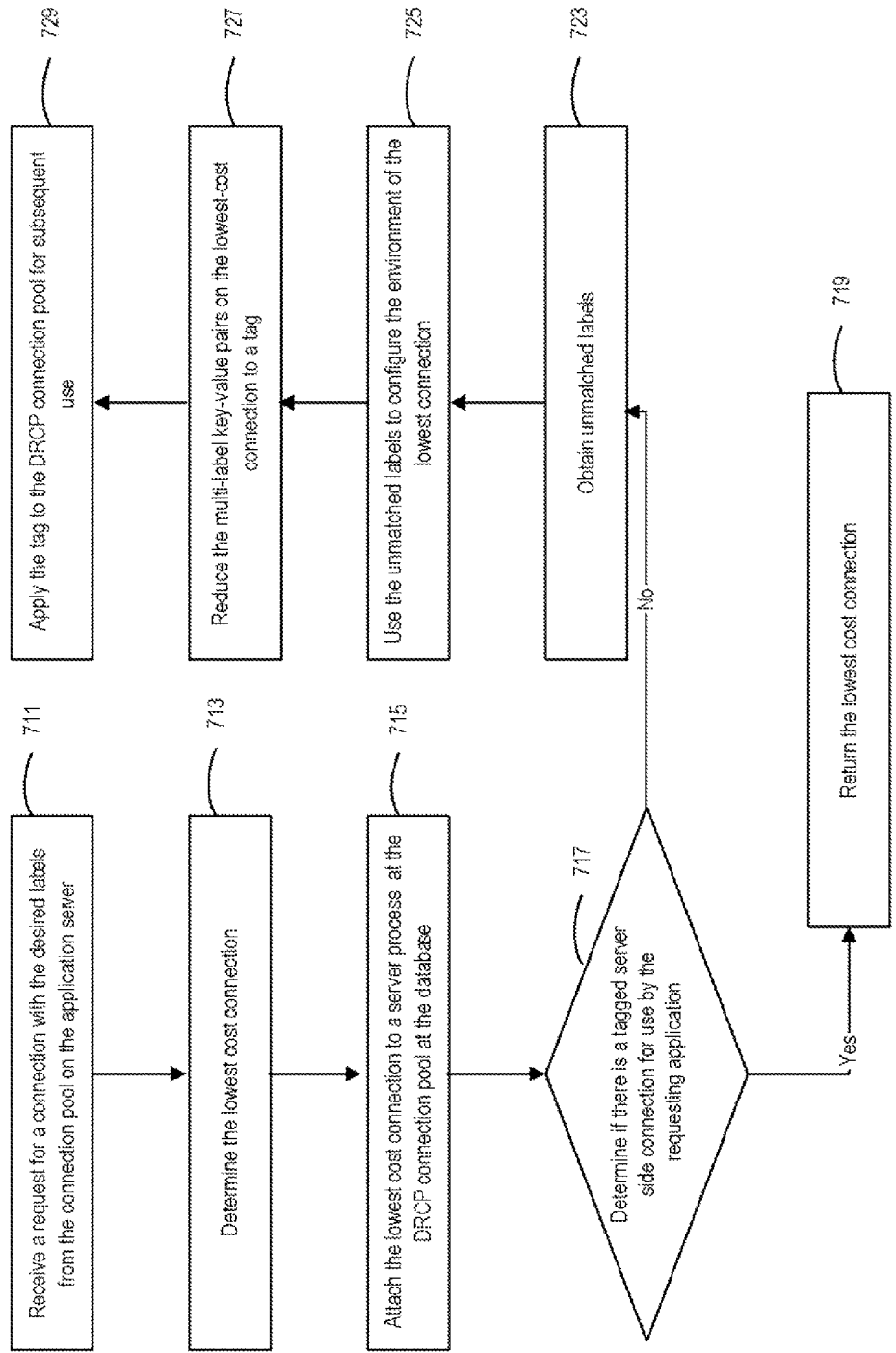
FIG. 7 is a flowchart that further illustrates a method of transparent multi key-value weighted attributed connection using uni-tag connection pools, in accordance with an embodiment.

FIG. 7 is a flowchart that further illustrates a method of transparent multi key-value weighted attributed connection using uni-tag connection pools, in accordance with an embodiment.

As shown in FIG. 7, at step 711, the application server receives a request for a connection with particular labels from the connection pool on the application server. In accordance with an embodiment, one or more connections in the connection pools are associated with a plurality of labels, each being a key-value pair and uniquely identifying the connections based on some desired criteria.

At step 713, the UCP connection pool can determine the lowest cost connection in the connection pool. In accordance with an embodiment, each connection in the pool is examined, and a cost of repurposing the connection to the desired state is calculated. In accordance with an embodiment, if there is a perfect match, the cost would be zero; the more difficult to configure the connection to the desired state, the costlier it is.

As further shown in FIG. 7, at step 715, the lowest cost connection can be attached to a server process in the DRCP connection pool. In accordance with an embodiment, the server process and a database session together constitute a connection. In accordance with an embodiment, each connection can be tagged with a uni-tag, a single string that can include multiple configuration properties of the connection.

At step 717, the UCP connection pool determines if there is a tagged server-side connection to use for the user application. If so, then after attaching to the server process of the tagged DRCP connection, the lowest connection can be returned to the user application without additional configurations, at step 719. Otherwise, at step 723, the system will obtain unmatched labels, and, at step 725, use the unmatched labels to reconfigure the environment of the lowest connection to the desired state as requested by the user application.

Upon closing the connection, at step 727, the system can reduce the multi-label key-value pair properties on the connection to a single string tag, and apply the tag to a server-side connection, for subsequent use by the application and other applications, at step 729.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated.

What is claimed is:

1. A system for attaching a connection at an application server to a connection at a database, the system comprising:
a computer including a microprocessor;
a first connection pool on an application server executing on the computer, wherein the first connection pool includes a plurality of connections, each connection having one or more labels, wherein the plurality of connections are used by software applications to access a database;
a second connection pool on the database, wherein the second connection pool includes a plurality of connections, each connection having a tag; and
wherein the application server, upon receiving a request from an application for a connection with a particular label from the first connection pool, operates to
calculate a configuration cost for each available connection in the first connection pool, wherein the reconfiguration cost represents a value for reconfiguring the available connection to a state represented by the particular label,
identify an available connection with a lowest configuration cost from the plurality of connections in the first connection pool, and
attach the connection with the lowest reconfiguration cost to a connection in the second connection pool based on a match between the label on the connection with the lowest reconfiguration cost and a tag associated with the connection in the second connection pool.

2. The system of claim 1, wherein the first connection pool on the application server is a universal connection pool (UCP), and wherein the second connection pool on the database is a database resident connection pool (DRCP).

3. The system of claim 1, wherein if no tagged connection in the second connection pool is found to match the label on the available connection with the lowest configuration cost in the first connection pool, the application server returns unmatched labels for use by the application in configuring its environment to use the connection with the lowest configuration cost.

4. The system of claim 3, wherein a tag is generated from a plurality of key-value pair properties on the configured connection with the lowest configuration cost, and is applied to a connection in the second connection pool on the database.

5. The system of claim 4, whereupon subsequent release of the tagged connection in the second connection pool, the tagged connection is made available for subsequent use by the same application or by other applications.

6. The system of claim 1, wherein each tag in the second connection pool is a string and associated with one connection in the second connection pool.

7. The system of claim 1, wherein each label on a connection is a name-value pair that uniquely identifies the connection based on a desired criterion.

8. The system of claim 1, wherein each connection in the second connection pool on the database includes a server process and a database session.

9. A method for attaching a connection at an application server to a connection at a database, the method comprising:
providing a first connection pool on an application server executing on one or more microprocessors, wherein the first connection pool includes a plurality of connections, each connection having one or more labels, wherein the plurality of connections are used by software applications to access a database;
providing a second connection pool on the database, wherein the second connection pool includes a plurality of connections, each connection having a tag;
receiving, at the application server, a request from an application for a connection from the first connection pool;
calculating a configuration cost for each available connection in the first connection pool, wherein the reconfiguration cost represents a value for reconfiguring the available connection to a state represented by the particular label;
identify an available connection with a lowest configuration cost from the plurality of connections in the first connection pool; and
attaching the connection with the lowest reconfiguration cost to a connection in the second connection pool based on a match between the label on the connection with the lowest reconfiguration cost and a tag associated with the connection in the second connection pool.

10. The method of claim 9, wherein the first connection pool on the application server is a universal connection pool (UCP), and wherein the second connection pool on the database is a database resident connection pool (DROP).

11. The method of claim 9, wherein if no tagged connection in the second connection pool is found to match the label on the available connection with the lowest configuration cost in the first connection pool, the application server returns unmatched labels for use by the application in configuring its environment to use the connection with the lowest configuration cost.

12. The method of claim 11, wherein a tag is generated from a plurality of key-value pair properties on the configured connection with the lowest configuration cost, and is applied to a connection in the second connection pool on the database.

13. The method of claim 12, whereupon subsequent release of the tagged connection in the second connection pool, the tagged connection is made available for subsequent use by the same application or by other applications.

14. The method of claim 9, wherein each tag in the second connection pool is a string and associated with one connection in the second connection pool.

15. A non-transitory computer readable medium, including instructions stored thereon which when read and executed by one or more computers cause the one or more computers to perform the steps comprising:
providing a first connection pool on an application server executing on one or more microprocessors, wherein the first connection pool includes a plurality of connections, each connection having one or more labels, wherein the plurality of connections are used by software applications to access a database;
providing a second connection pool on the database, wherein the second connection pool includes a plurality of connections, each connection having a tag;
receiving, at the application server, a request from an application for a connection from the first connection pool;
calculating a configuration cost for each available connection in the first connection pool, wherein the reconfiguration cost represents a value for reconfiguring the available connection to a state represented by the particular label;
identify an available connection with a lowest configuration cost from the plurality of connections in the first connection pool; and attaching the connection with the lowest reconfiguration cost to a connection in the second connection pool based on a match between the label on the connection with the lowest reconfiguration cost and a tag associated with the connection in the second connection pool.

16. The non-transitory computer readable medium of claim 15, wherein the first connection pool on the application server is a universal connection pool (UCP), and wherein the second connection pool on the database is a database resident connection pool (DRCP).

17. The non-transitory computer readable medium of claim 15, wherein if no tagged connection in the second connection pool is found to match the label on the available connection with the lowest configuration cost in the first connection pool, the application server returns unmatched labels for use by the application in configuring its environment to use the connection with the lowest configuration cost.

18. The non-transitory computer readable medium of claim 17, wherein a tag is generated from a plurality of key-value pair properties on the configured connection with the lowest configuration cost, and is applied to a connection in the second connection pool on the database.

19. The non-transitory computer readable medium of claim 18, whereupon subsequent release of the tagged connection in the second connection pool, the tagged connection is made available for subsequent use by the same application or by other applications.

20. The non-transitory computer readable medium of claim 15, wherein each tag in the second connection pool is a string and associated with one connection in the second connection pool.

\* \* \* \* \*

UNITED STATES PATENT AND TRADEMARK OFFICE
CERTIFICATE OF CORRECTION

| | | |
|---|---|---|
| PATENT NO. | : 9,785,687 B2 | Page 1 of 1 |
| APPLICATION NO. | : 14/202348 | |
| DATED | : October 10, 2017 | |
| INVENTOR(S) | : Shivarudraiah et al. | |

It is certified that error appears in the above-identified patent and that said Letters Patent is hereby corrected as shown below:

In the Drawings

On sheet 4 of 7, in FIGURE 4, under Reference Numeral 360, Line 4, delete "lablels" and insert -- labels --, therefor.

In the Specification

In Column 1, Line 31, after "14/253,580" insert -- , --.

In Column 1, Line 35, after "14/253,573" insert -- , --.

In Column 1, Line 37, after "OF" delete "FRAGMENTS".

In Column 1, Line 39, after "14/259,499" insert -- , --.

In the Claims

In Column 10, Line 24, in Claim 10, delete "(DROP)." and insert -- (DRCP). --, therefor.

Signed and Sealed this
Twenty-ninth Day of May, 2018

Andrei Iancu
*Director of the United States Patent and Trademark Office*